No. 796,495. PATENTED AUG. 8, 1905.
A. CAIRNS.
CAR COUPLING.
APPLICATION FILED NOV. 28, 1904.
2 SHEETS—SHEET 1.
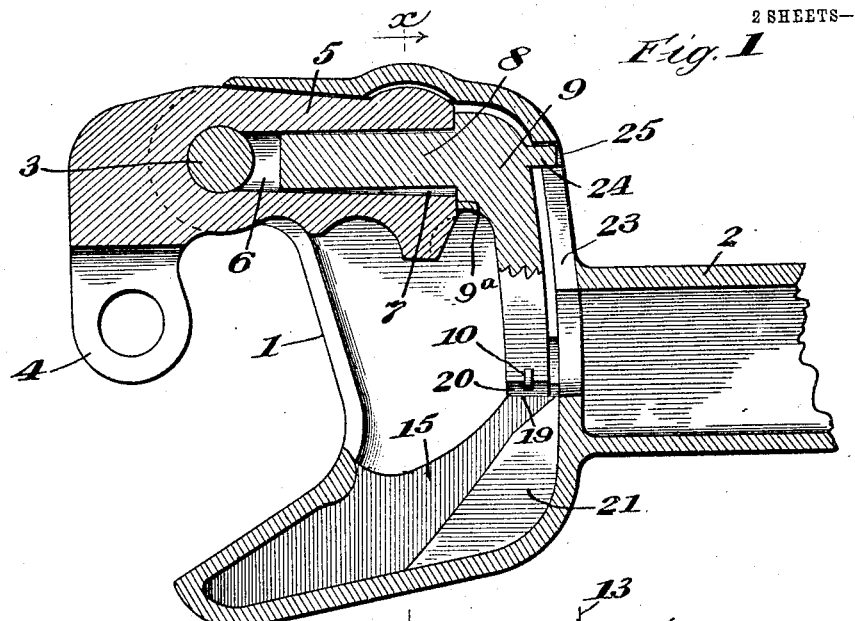
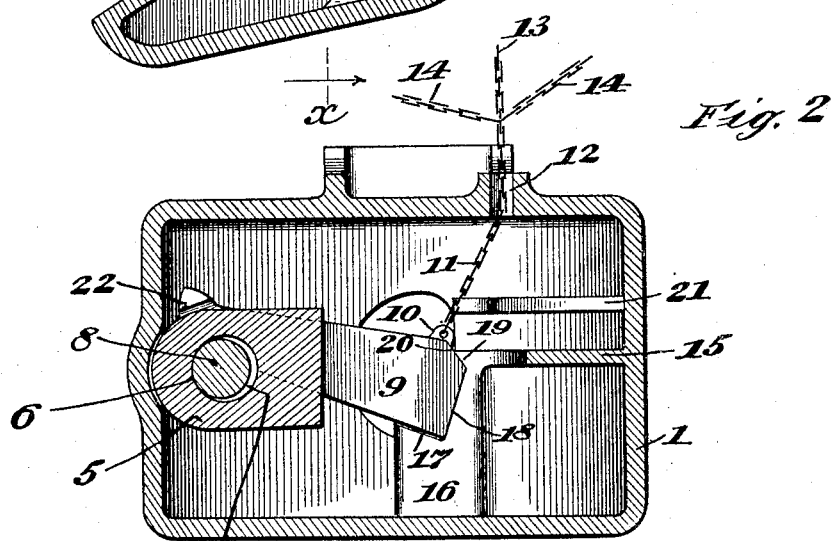
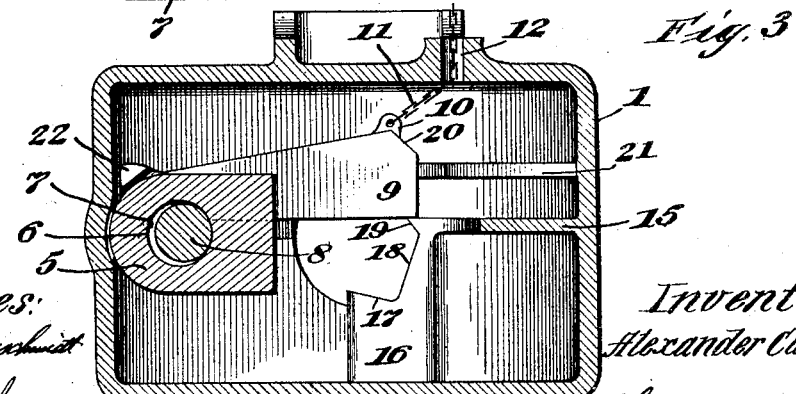
Witnesses:
G. A. Raubenheimt
A. Gustafson
Inventor:
Alexander Cairns
By Chas. C. Tillman
Atty

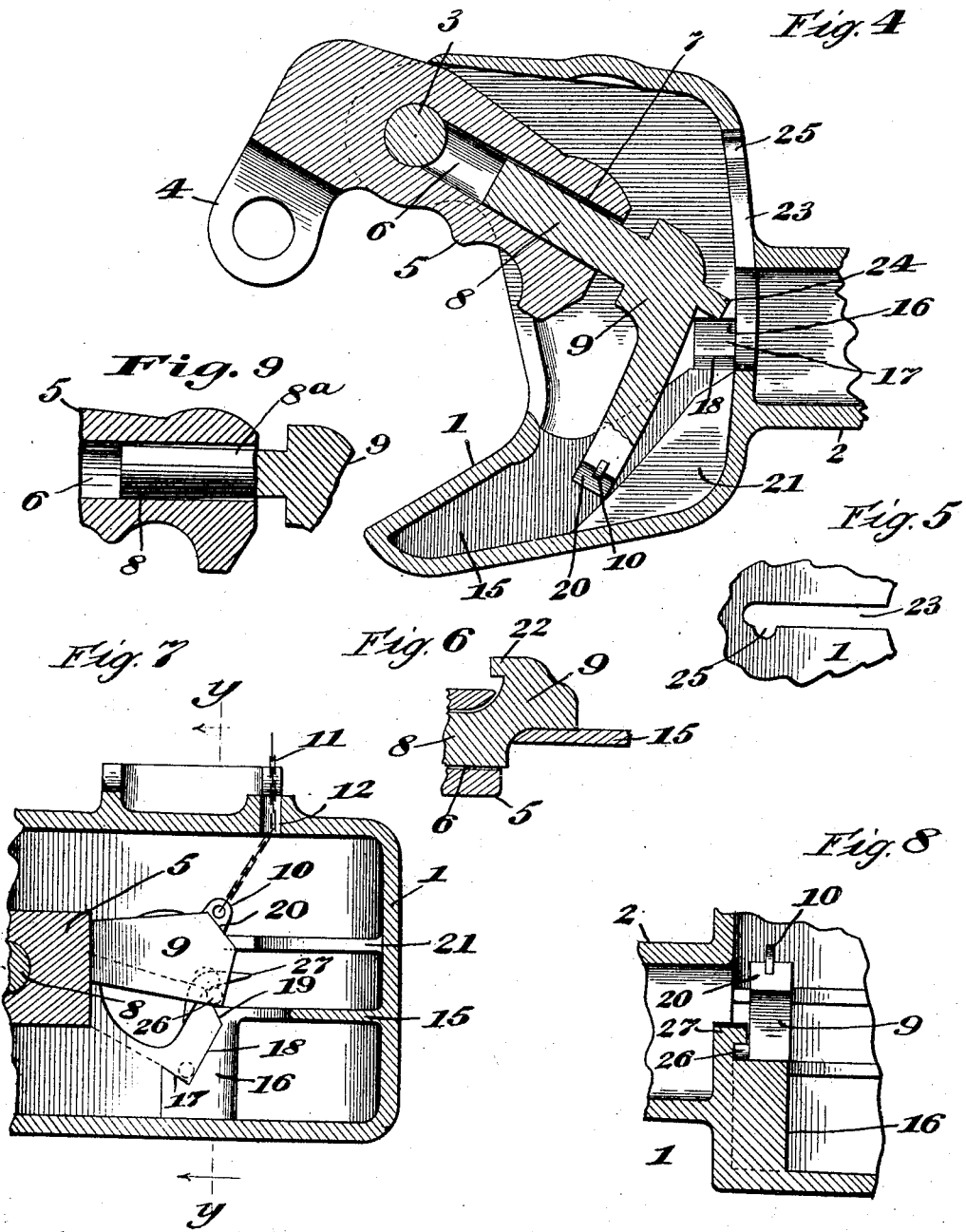

UNITED STATES PATENT OFFICE.

ALEXANDER CAIRNS, OF CHICAGO, ILLINOIS.

CAR-COUPLING.

No. 796,495. Specification of Letters Patent. Patented Aug. 8, 1905.

Application filed November 28, 1904. Serial No. 234,472.

*To all whom it may concern:*

Be it known that I, ALEXANDER CAIRNS, a citizen of the United States, and a resident of Chicago, in the county of Cook and State of Illinois, have invented certain Improvements in Car-Couplings, of which the following is a specification.

This invention relates to certain improvements in car-couplings, and more particularly in that class of such devices wherein the knuckle is provided with a dog or latch movable for engagement with a locking lug or shoulder within the coupler-head; and the object of the invention is to provide a coupling of this general character of a simple and inexpensive nature and of a compact, strong, and durable construction which shall not be liable to become readily deranged or broken during use and wherein is provided improved and simple means for insuring the movement of the dog or latch into locked position when the knuckle is pivotally moved in the coupling operation.

The invention consists in certain novel features of the construction and combinations and arrangements of the several parts of the improved car-coupling whereby certain important advantages are attained and the operation of the locking latch or dog is rendered more certain and positive and whereby the device is rendered simpler, cheaper, and otherwise better adapted and more convenient for use, all as will be hereinafter fully set forth.

The novel features of the invention will be carefully defined in the claims.

In the accompanying drawings, which serve to illustrate my invention, Figure 1 is a transverse section taken horizontally through the coupler-head in the plane of the pivotal axis of the locking dog or latch, the extremity of said dog or latch, together with the cam and supporting-ledge of the coupler-head, which are adapted for engagement therewith, being, however, seen in plan. Fig. 2 is a vertical section taken transversely through the coupler-head in the plane indicated by the line $x\ x$ in Fig. 1 and showing the locking dog or latch in locked position. Fig. 3 is a transverse sectional view similar to Fig. 2, but showing the locking dog or latch in raised or unlocked position. Fig. 4 is a horizontal sectional view similar to Fig. 1, but showing the knuckle thrown in opened position, the locking latch or dog being of course also in a similar position. Fig. 5 is a view showing a fragment of the rear wall of the coupler-head for illustrating the form of the guide-slot wherein is received the locking-pin of the dog or latch, and Fig. 6 is a sectional detail view taken vertically through the locking-arm of the knuckle and the latch engaged therewith and showing the arrangement of the locking-lug upon said latch. Fig. 7 is a fragmentary sectional view similar to Fig. 3, but showing a modified form of the means for assuring the operation of the locking-latch when the knuckle is moved pivotally into closed position; and Fig. 8 is a vertical section taken through the coupler-head in the plane shown by line $y\ y$ in Fig. 7 and illustrating said modified construction. Fig. 9 is a sectional detail view taken transversely through the locking-arm of the knuckle and the latch carried thereby and showing a modified form of said latch.

As shown in the views, 1 indicates the coupler-head, and 2 indicates the shank, while 3 is the pivot pin or bolt whereon is held for pivotal movement in the ordinary way the knuckle 4, having a rearwardly-directed locking-arm 5, which traverses the cavity of the coupler-head when the knuckle is moved into open or closed position and is provided with a bore or passage 6, extended in it at right angles to the direction of the pivot pin or bolt 3 and with an end open at the rear end of said locking-arm 5 of the knuckle.

8 represents a cylindrical stud produced upon and forwardly extended from one end of the locking latch or dog 9 and adapted to be received for pivotal and endwise-sliding movement within the bore or opening 6 of the locking-arm 5 of the knuckle, the diameter of said pivot stud or projection 8 being sufficient to produce a snug fit at its forward extremity when the stud or projection is pushed home in the bore 6, as shown in Fig. 1. The rear open end of the bore 6 is, however, laterally enlarged or made elliptical, as shown at 7 on the drawings, so that when the stud or projection is pushed entirely within said bore, as shown in Fig. 1, a certain extent of lateral movement of the dog or latch with relation to the locking-arm 5 of the knuckle is still permitted for purposes to be hereinafter explained. The dog or latch 9 has upon its front face and adjacent to the stud or projection 8 a shoulder, as shown at $9^a$, which is adapted for engagement upon the rear end of the locking-arm 5 of the knuckle to limit the inserting movement of the stud or projection 8 within the bore 6 of the said locking-arm.

The dog or latch 9 is horizontally extended from the locking-arm 5 of the knuckle and is adapted for pivotal movement in a vertical plane, whereby its free end may be moved into and out of locking position, and said free end of the dog or latch is provided with an eye 10 for connection with a chain 11, which is extended upward through an opening 12 in the top of the coupler-head and has three draft connections—a central connection 13, which may extend to the car-roof, and two opposite lateral connections 14 14, which may be extended to opposite sides of the car, so that draft may be exerted on the chain 11 from either of these situations for lifting the latch or dog 9 out of locked position to release the knuckle in uncoupling.

15 indicates a supporting ledge or table integral with the coupler-head and extended in its cavity in a horizontal plane along the wall opposite to which the knuckle is pivoted, and the function of said ledge or table is to support the free end of the dog or latch when elevated in its unlocked position during the movement of the knuckle in opening and closing its jaw, and the opening 12 in the top of the coupler-head is so arranged as to stand in a plane on the side of the eye 10 of the latch or dog opposite to its pivot-stud 8, so that when draft is exerted on chain 11 to lift the dog or latch into unlocked position such draft will also be in a direction adapted to draw the free end of the dog or latch laterally to an extent sufficient to engage it upon the ledge or table 15, so that in the further operation of the parts said dog or latch may be held against accidentally falling into locked position.

16 indicates a lug integral on the back wall of the coupler-head adjacent to the end of the ledge or table 15, and said lug 16 is provided with a locking-recess 17, in which is adapted to be received the free end of the latch or dog 9 when the same is slipped off the end of the supporting ledge or table 15 and drops into locked position, as shown in Fig. 2, and said recess 17 is provided with a surface 18, which is made in a plane substantially concentric with the pivotal axis of the locking dog or latch and forms a bearing on which the end surface of said dog or latch is engaged to permit of resisting strains imposed by the draft upon the knuckle, which tend to throw the same open. The shoulder or bearing 18 is, as seen in Figs. 2 and 3, substantially in horizontal alinement with the pivotal axis of the latch or dog 9, so that draft upon the knuckle is not permitted to throw the dog or latch upwardly.

At the upper part of the bearing 18 the lug 16 has an overhanging locking shoulder or projection 19, the lower or under surface of which is beveled and the upper surface of which is flush with and forms the extremity of the supporting ledge or table 15, and upon the extremity of the locking dog or latch 9 is produced an inclined surface 20, corresponding with and adapted to fit flush upon the inclined lower surface of said locking projection 19 when the dog or latch is lowered into locking position, as shown in Fig. 2, in such a way as to securely hold the dog or latch from being elevated and unlocked, especially when draft is exerted upon the knuckle.

Above the supporting ledge or table 15 is a cam 21, also integral on the wall of the coupler-head and adapted for engagement on the end of the locking dog or latch 9 to force the stud or projection 8 home in the bore of the knuckle-arm 5 when the knuckle is closed, the arrangement of chain 11 serving to draw said stud 8 rearward in the reverse direction as the knuckle is opened.

22 indicates a locking-lug integral upon and projecting laterally from the upper part of the dog or latch 9, as shown in Figs. 2 and 3, said locking-lug being so located that when the dog is raised in its unlocked position, as shown in Fig. 3, said lug 22 is adapted when the knuckle is swung into closed position in the coupling operation to strike upon the wall of the coupler-head at the side at which the knuckle is pivoted in such a way as to impart to the latch or dog a certain extent of movement pivotally relative to the locking-arm of the knuckle. In this pivotal movement of the dog or latch the stud or projection 8 turns in the bore or passage 6 of the locking-arm of the knuckle.

The several parts of the device, including the knuckle and its locking-arm and the bore thereof and the dog or latch and its stud 8 and locking-lug 22, are so proportioned that when the knuckle is swung into closed position its locking-arm 5 will strike upon the wall of the coupler-head in advance of the contact of the locking-lug 22 of the dog or latch with said wall; but the impetus imparted to the dog or latch, due to the connection of said dog or latch with the locking-arm of the knuckle, will be sufficient to cause the stud or projection 8 of the dog or latch to play laterally in the enlarged portion 7 of the bore 6 in the knuckle-arm until the locking-lug 22 shall have come into contact with the wall of the coupler-head.

By reason of the lateral movement of the dog or latch afforded, as above described, by the enlargement of the bore in the knuckle-arm and wherein the stud or projection of the dog or latch is engaged it will be evident that the free locking end of the latch will be moved laterally within the hollow of the coupler-head in a direction toward the left-hand side of the device as the parts are illustrated in Fig. 3, and in this way it will be evident that at the time the locking-lug 22 is caused to contact with the wall of the coupler-head the said free end of the dog or latch will have been moved past the locking projection 19 at the end of the supporting ledge or table 15, whereby when pivotal movement is imparted to the latch or dog, as above described, and upon contact of the locking lug 22 with the wall of the coupler-head the free end of the dog, being no longer supported by the ledge or table 15, will be positively and forcibly impelled downward, so that the dog or latch will assume the locked position shown in Fig. 2, with its free end engaged in the recess 17 beneath the overhanging locking projection 19.

23 indicates a slot horizontally produced in the rear wall of the coupler-head and adapted for engagement with a pin or projection 24, rearwardly extended from the latch or dog 9 adjacent to its pivot-point and adapted as the knuckle is moved to play lengthwise of said slot, and in the under side of said slot at the point whereat pin or projection 24 stands when the parts are locked is produced a cam-notch 25, in which the pin or projection is adapted to be received at such times.

In the operation of the coupler when the knuckle is swung into closed position in the coupling operation its closing movement will of course continue until its locking-arm 5 is brought into engagement with the wall of the coupler-head at the side at which the knuckle is pivoted, at which time the free end of the latch 9 will pass the locking projection 19 and be in position to fall by gravity into engagement in the locking-recess 17. At the same time the lug 22 on the upper part of the latch or dog will contact with said side wall of the coupler-head, so as to move said latch or dog pivotally and positively impel or move the free end thereof downward into said recess 17, whereby it will be apparent that the parts will be locked, the strain upon the knuckle being sufficient to hold the free end of the dog or latch securely engaged beneath the beveled under surface of said locking projection 19, whereby while such strain is present the latch cannot be elevated or unlocked.

The pin 24 and the slot 23 with cam-notch 25, wherein said pin is engaged, form an auxiliary latch-operating means, which is also adapted in the closing of the knuckle to move the free end of the latch downward into locked position. In the operation of this auxiliary means when the knuckle is swung closed the pin 24 will drop into cam-notch 25 as the locking-arm 5 arrives at its locking position; but in the impact of the coupling operation the knuckle will be swung far enough, as above described, to engage its arm 5 upon the wall of the coupler-head, so that the pin 24 will be caused to ride up after entering the cam-notch, and thereby pivotal movement will be imparted to the latch, so that the free end thereof will be swung downward and engaged in the locking-recess 17.

In uncoupling draft applied to the chain 11 will elevate the free end of latch 9, the locking-arm 5 of the knuckle being meanwhile swung over far enough toward the wall of the head at which said knuckle is pivoted to permit such elevation of the dog and the direction in which the draft is applied by chain 11 being such that when the latch is elevated its free end will at once be drawn over far enough to permit it to pass the projection 19 and rest upon the ledge or table 15, as shown in Fig. 3.

The play afforded by the lateral enlargement of the mouth 7 of the bore in the knuckle-arm 5 insures sufficient movement of the latch or dog relative to said arm 5 to permit the secure engagement of the free end of latch 9 upon the ledge 15 as soon as the latch is elevated.

From the above description it will be apparent that the improved coupling constructed according to my invention is of an extremely simple and inexpensive nature and is especially well adapted for use not only on account of the absence of complicated mechanism or delicate parts liable to become readily broken or deranged from the rough usage to which such devices are subjected, but also by reason of the certainty of the operation of the locking means and the security with which they are prevented from being unlocked during such times as draft is exerted upon the knuckle. The dog or latch 9 would tend to fall by gravity into locked position even were the actuating means for positively throwing it downward not provided; but in order to assure certainty of its actuation it is preferable to employ such operating means. The chain 11 will also by preference have a measured length within the cavity of the coupler-head, and its connection with the draft connections 13 and 14 14 will produce thereon an enlargement to limit the length of said chain which is permitted to enter the coupler-head. It will also be obvious from the above description that the improved coupling constructed according to my invention is capable of some modification without material departure from the principles and spirit of the invention, and for this reason I do not wish to be understood as limiting myself to the precise form and arrangement of the several parts of the device herein set forth in carrying out my invention in practice. For example, in Figs. 7 and 8 I have shown a modified arrangement of the means for depressing the free end of the dog or latch 9 into locked position. In this form of the device the free end of the latch has a pin or projection 26 upon its rear side, which when said latch passes over the end of ledge or table 15 comes into engagement with a downwardly-inclined cam 27 upon the rear wall of the coupler-head, and thereby serves to press said end of the latch down into engagement with the locking-notch 17. In this form of the device the free end of the latch stands when locked in a plane below its pivotal center.

In Fig. 9 I have shown another modified arrangement wherein in lieu of forming the bore 6 of the knuckle-arm 5 with a laterally-enlarged mouth portion I have made the stud 8 tapered, its portion $8^a$ adjacent to latch 9 being of reduced diameter to permit the lateral play of said stud in the bore 6 essential for assured holding of the latch in raised position when unlocked.

Having thus described my invention, what I claim, and desire to secure by Letters Patent, is—

1. In a car-coupling, the combination of a head having a locking-recess, a knuckle pivoted on the head and provided with a pivoted latch in said recess and a locking-shoulder overhanging the locking-recess at the side opposite to which the knuckle is pivoted.

2. In a car-coupling, the combination of a head having a locking-recess, a knuckle pivoted on the head and provided with a pivoted latch adapted for engagement with said recess and a locking-shoulder overhanging the locking-recess at the side opposite to which the knuckle is pivoted and having an inclined under surface to be engaged by the free end of the latch.

3. In a car-coupling, the combination of a head having a locking-recess, a knuckle pivoted on the head and provided with a pivoted latch adapted for engagement in said recess, a locking-shoulder overhanging the locking-recess at the side opposite to which the knuckle is pivoted and having an inclined under surface to be engaged by the free end of the latch and a chain having a measured length within the coupler-head and having connection with the free end of the latch for elevating the same.

4. In a car-coupling, the combination of a head having a locking-recess, a knuckle pivoted on the head and provided with a pivoted latch for engagement in said recess, a locking-shoulder overhanging said locking-recess at the side opposite to which the knuckle is pivoted, a ledge or table having an end adjacent to said shoulder and adapted to support the latch when raised and means for elevating said latch.

5. In a car-coupling, the combination of a head having a locking-recess, a knuckle pivoted on the head and provided with a pivoted latch adapted for engagement in said recess, a locking-shoulder overhanging the locking-recess at the side opposite to which the knuckle is pivoted, a ledge or table having an end adjacent to said shoulder and adapted for supporting the latch when raised and a chain connected with the free end of the latch and extended in the coupler-head in a direction upwardly inclined from said free end of the latch toward the side of the head opposite to which the knuckle is pivoted.

6. In a car-coupling the combination of a head having a locking projection, a knuckle pivoted on the head and having a locking-arm to traverse the head, said arm having a longitudinal bore produced in it, and a latch having a stud pivotally held in the bore of said knuckle-arm and having a free end engageable with said locking projection of the coupler-head.

7. In a car-coupling, the combination of a head having a locking projection, a knuckle pivoted on the head and having a locking-arm to traverse the head, said arm having a longitudinal bore produced in it and a latch having a stud pivotally held in the bore of said knuckle-arm and having a free end engageable upon said locking projection of the coupler-head, said stud of the latch being adapted for lateral movement within the bore of the knuckle-arm.

8. In a car-coupling, the combination of a head having a locking-recess, a locking projection overhanging the said recess, a knuckle pivoted on the head and having a locking-arm to traverse the head, said arm having a longitudinal bore produced in it, a latch having a stud pivotally held in the bore of said knuckle-arm and adapted for lateral movement therein and having a free end engageable in said locking-recess beneath the locking projection of the coupler-head, means for raising the free end of the latch out of said locking-recess and means to hold said latch elevated when raised out of said recess.

9. In a car-coupling, the combination of a head having a locking-recess, a knuckle pivoted on the head and provided with a pivoted latch adapted for engagement in said recess, a locking-shoulder overhanging the locking-recess at the side opposite to which the knuckle is pivoted, means for elevating the latch to disengage it from said recess and means for moving the latch pivotally to force its free end downward into said locking-recess.

10. In a car-coupling, the combination of a head having a locking-recess, a locking-shoulder overhanging said recess, a knuckle pivoted to the head and having an arm to traverse the same, a latch pivoted on the arm with a free end engageable in the locking-recess below the locking projection, means for raising the latch and a lug produced on the latch for contact on the wall of the coupler-head to force said latch in engagement with the locking-recess.

11. In a car-coupling, the combination of a head having a locking-recess, a locking projection overhanging the recess, a knuckle having an arm traversing the head, a latch pivotally held on the knuckle-arm with a free end engageable in said recess below the locking projection, means for raising the latch and a pin on the latch, the rear wall of the coupler-head having a horizontal slot provided with a cam-notch and adapted to receive said pin on the latch.

12. In a car-coupling, the combination of a head having a locking-recess and provided with a supporting-ledge above said recess, a knuckle having an arm traversing said head, a latch pivoted on the knuckle and adapted for lateral movement relatively thereto, means for raising the latch and means for moving said latch pivotally.

In testimony whereof I have hereunto signed my name, at Chicago, Illinois, in the presence of two subscribing witnesses, this 26th day of November, 1904.

ALEXANDER CAIRNS.

Witnesses:
 CHAS. C. TILLMAN,
 A. GUSTAFSON.